(12) United States Patent
Chang et al.

(10) Patent No.: US 6,330,247 B1
(45) Date of Patent: Dec. 11, 2001

(54) COMMUNICATION PROTOCOL BETWEEN A COMMUNICATION DEVICE AND AN EXTERNAL ACCESSORY

(75) Inventors: Chienchung Chang; Way-Shing Lee; Robert Opalsky; George Pan; Karthick Chinnaswami; Hanchi David Huang; Steven C. Den Beste; James Hutchison, all of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/248,514

(22) Filed: Feb. 8, 1999

(51) Int. Cl.[7] .............. H04B 7/212; H04J 3/00
(52) U.S. Cl. .............. 370/442; 370/337; 379/388.01; 704/503
(58) Field of Search .................... 370/442, 436, 370/264, 362, 228, 271, 337, 260; 348/563; 375/257, 216, 220, 346; 455/556; 704/503; 379/388.01; 709/236

(56) References Cited

U.S. PATENT DOCUMENTS

| | | | |
|---|---|---|---|
| 4,397,030 | * 8/1983 | Becker et al. | 375/257 |
| 5,040,172 | * 8/1991 | Mano et al. | 370/362 |
| 5,291,479 | * 3/1994 | Vaziri et al. | 370/264 |
| 5,333,176 | 7/1994 | Burke et al. | 455/557 |
| 5,414,796 | 5/1995 | Jacobs et al. | 704/221 |
| 5,487,066 | * 1/1996 | McNamara et al. | 370/436 |
| 5,754,589 | * 5/1998 | Maitra et al. | 375/216 |
| 5,764,627 | * 6/1998 | Sharma et al. | 370/271 |
| 5,801,785 | * 9/1998 | Crump et al. | 348/563 |
| 6,038,457 | * 3/2000 | Barkat | 455/556 |
| 6,088,362 | * 7/2000 | Turnbull et al. | 370/442 |
| 6,115,689 | * 9/2000 | Malvar | 704/503 |

FOREIGN PATENT DOCUMENTS 3737647   5/1989   (DE).

\* cited by examiner

*Primary Examiner*—Hassan Kizou
*Assistant Examiner*—John Pezzlo
(74) *Attorney, Agent, or Firm*—Philip R. Wadsworth; Kent D. Baker; Thomas R. Rouse

(57) ABSTRACT

A method and apparatus for communicating both voice and control data between a communication device (such as a cellular phone) and an external accessory (such as a hands-free kit) over a data bus. The method includes formatting a sequence of bits into a repeating sequence of first time slots and second time slots, transmitting the voice data in the first time slot, and transmitting the control data in the second time slot. Notably, a first bit of each of the second time slots comprises a clock bit that alternates between a high value and a low value (e.g. a '1' or a '0') as between consecutive second time slots.

20 Claims, 2 Drawing Sheets

COMMUNICATION PROTOCOL BETWEEN A COMMUNICATION DEVICE AND AN EXTERNAL ACCESSORY

BACKGROUND OF THE INVENTION

I. Field of the Invention

The present invention relates to digital communication protocols. More particularly, the present invention relates to a novel and improved communication protocol between a communication device such as a portable wireless telephone, and an external accessory such as a hands-free kit.

II. Description of the Related Art

In the art of digital audio processing, an audio band encoder/decoder (CODEC) is typically used to convert analog audio signals to encoded digital signals, and vice-versa. For example, the CODEC may receive the analog output of a microphone, and convert the microphone-generated analog audio signal into a Pulse Code Modulation (PCM) encoded digital audio signal for further digital signal processing in a digital signal processor (DSP). Additionally, the CODEC may receive a PCM-encoded digital audio signal from the DSP and convert it to an analog audio signal for use by an audio speaker. Of course, the CODEC may use additional digital encoding techniques as are known in the art, such as A-law, $\mu$-law, or the like, or may merely use any other linear or non-linear encoding techniques.

A typical portable radiotelephone having an internal CODEC may be interfaced with one or more external accessories. For example, the portable radiotelephone user may desire to use his portable radiotelephone in his car while driving, and thus interface it with a hands-free speakerphone, a power booster, and/or a voice-operated dialer or voice recognition system. The hands-free speakerphone (or hands-free "kit") allows the user to make phone calls, via an external loudspeaker and microphone, without holding the radiotelephone, leaving the user's hands free to drive the car. The power booster couples radio frequency (RF) signal to and from the portable radiotelephone's own antenna, amplifying the RF signal for the higher power transmission and reception that is desirable when operating off of a car battery. A voice dialer responds to verbal commands from the user. For example, dialing from a set of preprogrammed telephone numbers according to the voice commands, dialing individual digits one at a time, or changing the operating mode of the radiotelephone. These accessories are often used at the same time as part of a car adapter kit.

A typical interface circuit between a portable radiotelephone and an external car kit is given in co-pending U.S. patent application Ser. No. 08/593,305, entitled "PORTABLE COMMUNICATION DEVICE AND ACCESSORY SYSTEM", filed Jan. 31, 1996, assigned to the assignee of the present invention and incorporated herein by reference. The just-mentioned application discloses a portable communications device and accessory system which enables both voice and control commands to be communicated between a portable communication device and external accessories over a single flexible digital interface. When the portable communication device is interfaced to external accessories, such as a power booster and hands-free kit, a microprocessor configures the serial communications bus to pass both the digital voice data and digital control commands to and from the external power booster and the hands-free kit. The external hands-free kit contains its own auxiliary CODEC for encoding analog voice signals and decoding the digital voice data. When the portable communication device is not interfaced with external accessories, the microprocessor configures the serial communication bus to pass the digital voice data to and from an internal CODEC for use with the portable device's own microphone and speaker.

However, there remains a need for a method and apparatus which implements a communication protocol between a portable wireless communication device such as a portable wireless telephone, and an external accessory such as a hands-free kit.

SUMMARY OF THE INVENTION

The present invention is a novel and improved method and apparatus for communicating both voice and control data between a communication device (such as a cellular phone) and an external accessory (such as a hands-free kit). The apparatus includes a communication device. This may be the cellular telephone. The communication device further comprises a microprocessor, a vocoder coupled to the microprocessor, read and write registers coupled to the microprocessor, and a multiplexer coupled to both the vocoder and the write register. The communication device communicates over a data bus with an external accessory. The external accessory includes a digital signal processor, and a CODEC.

The apparatus of the present invention performs the method that is also referred to herein as a communication protocol. The method or protocol is for communicating both voice and control data between a communication device and an external accessory over a data bus. The method includes formatting a sequence of bits into a repeating sequence of first time slots and second time slots, transmitting the voice data in the first time slot, and transmitting the control data in the second time slot. Notably, a first bit of each of the second time slots comprises a clock bit that alternates between a high value and a low value (e.g. a '1' or a '0') as between consecutive second time slots. This allows the receiving end (ie., either the microprocessor in the communication device or the digital signal processor in the external accessory) to distinguish between consecutive bytes of data.

The sequence of second time slots comprises N+1 bytes. An initial byte of the N+1 bytes further comprises a synchronization bit sequence. A second of the N+1 bytes includes mode bits for defining a meaning of the remainder of the N+1 bytes (e.g., the data bits). Preferably, N is an odd integer so that all commands and control information is expressed as an even number of control bytes. Thus, when combined with the alternating dock bit scheme, this ensures that the initial byte always starts with the same clock bit.

The clock bit of a last byte of the N+1 bytes is of an opposite polarity than the clock bit of the initial byte of the N+1 bytes. This allows the receiving end to distinguish between consecutive commands that may be spread across two or more control bytes, interspersed with voice data. The method further includes setting a second bit of each of a respective third and higher-order of the N+1 bytes to an opposite polarity as the clock bit of each of the respective third and higher-order of the N+1 bytes. This prevents the receiving end from confusing control byte that contains data from a control byte that contains the synchronization bit sequence.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
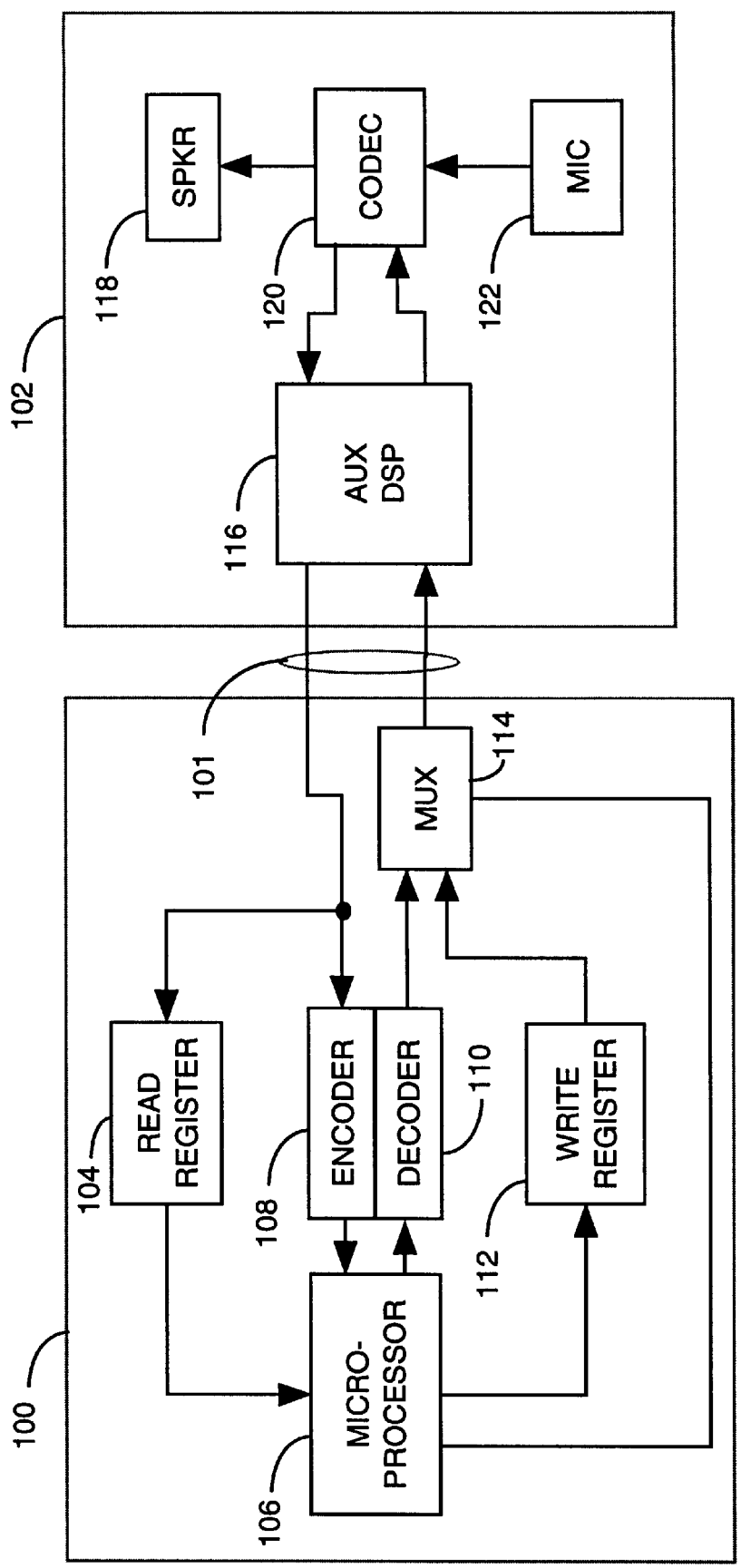
FIG. 1 is functional block diagram of the apparatus of the present invention.

FIG. 1 illustrates a functional block diagram of the apparatus of the present invention. Selected portions of a communication device 100, such as a portable cellular telephone, PCS telephone, PDA or the like, is shown interfacing with an external accessory 102 over a data bus 101. In the presently preferred embodiment, the data bus 101 is a full-duplex, synchronous serial bus with the exemplary data rate of 128 Kilo bits per second (Kbps). The data bus 101 carries Pulse-Code Modulated (PCM) data from the communication device 100 to the external accessory 102, and from the external accessory 102 to the communication device 100.

In the presently preferred embodiment, the functional block elements shown as being part of communication device 100 (i.e., microprocessor 106, read register 104, write register 112, encoder 108, decoder 110 and multiplexer (MUX) 114) are all implemented in a single Application Specific Integrated Circuit (ASIC). Combining all of these functional blocks into a single ASIC has several advantages that are well known in the art, including reduced power consumption, reduced size, and decreased cost. However, it is contemplated by the present invention that some or all of these functional blocks may be implemented in physically separate devices, or grouped as desired. The actual implementation of these functional blocks is a matter of design choice based on the specific application, without departing from the present invention. Similarly, the functional block elements shown as being part of external accessory 102 may be implemented as a single ASIC, or in physically separate elements without departing from the present invention.

The presently preferred format of the data bus 101 includes a repeating sequence of two 8-bit, 8 KHz time slots. In other words, the 128 Kbps data stream may be viewed as two blocks of 8 bit samples, at 8 kilo samples per second. The first of the two 8-bit blocks is used for transmitting data samples. Preferably, the data samples are companded. In an exemplary voice application, the data samples are preferably companded as 8-bit $\mu$-law or A-law. It is understood that other compression schemes may be used as are known in the art, or that the data may be merely linear (uncompanded). The second of the two 8-bit blocks is used to transmit control commands. These control commands may be for various modes of operation, including voice recognition, acoustic echo canceling, automatic gain control, and so forth.

As can be seen from FIG. 1, there are two data paths by which the microprocessor 106 may issue a control command to the external accessory 102 over the data bus 101. The first path begins when microprocessor 106 generates an 8-bit control byte that is then passed to decoder 110. Together, decoder 110 and encoder 108 form a voice encoder/decoder (vocoder) such as that described in U.S. Pat. No. 5,414,796, entitled "Variable Rate Vocoder", issued May 9, 1995, assigned to the assignee of the present invention and incorporated herein by reference. The decoder 110 combines this 8-bit control byte from the microprocessor 106 with an 8-bit byte of companded voice data, and transmits the combined 8-bit bytes (a total of 16 bits) via MUX 114 over data bus 101 to external accessory 102. When using this first path, the microprocessor 106 configures MUX 114 to pass the output of decoder 110 over the data bus 101. This first path is useful, for example, for the microprocessor 106 to send control data in the acoustic echo canceling mode when the decoder 110 is "on" (i.e., powered-up and actively processing voice samples).

The second path begins when the microprocessor 106 generates an 8-bit control byte that is then written to write register 112. Write register is preferably 16 bits wide. If microprocessor 106 cannot read or write data as fast as 8 KHz, it can simply write the 8-bit control byte into the $2^{nd}$ byte of write register 112. Write register 112 may be co-located in the same vocoder as decoder 110. The 8-bit control byte is then transmitted through MUX 114 over data bus 101 based on the PCM interrupts on the data bus 101. Note that in this second path, the decoder 110 need not be turned "on". This second data path is useful, for example, for the microprocessor 106 to send control data in the voice recognition mode when the decoder 110 is "off".

In either case, the companded data (e.g., voice data in the first 8-bit block) is provided to CODEC 120 by AUX DSP 116. CODEC 120 decodes the voice data, and converts it to an analog audio-band voice signal for reproduction over speaker 118. The control byte (e.g., control commands in the second 8-bit block) is provided to the appropriate entity in the external accessory 102. For example, acoustic echo canceling commands are provided to the AUX DSP 116.

In the reverse direction (i.e., from the external accessory 102 to the communication device 100), the auxiliary digital signal processor (AUX DSP) 116 sends two 8-bit, 8 KHz samples over the 128 Kbps data bus 101 to both encoder 108 and read register 104. Again, the first of the two 8-bit blocks contains companded data (e.g., voice data sensed by microphone 122 and encoded by CODEC 120), and the second 8-bit block contains control data.

Preferably, read register 104 is 16 bits wide. Both the first and second time slots (both PCM and control bytes from AUX DSP 116) will update read register 104 at 8 KHz (i.e., update every time a new sample is received). If microprocessor 106 cannot read the PCM samples (the first slot) fast enough, the sample may be overwritten before microprocessor 106 can read it. A typical microprocessor 106 cannot read the read register 104 that fast. Thus, in the preferred embodiment, the control byte (the second slot) is repeated, for example, 10 ms or 80 times, to allow enough time for microprocessor 106 to read it. It can then read the message in the control byte location of read register 104 even if it must ignore the PCM byte.

In the presently preferred embodiment, read register 104 is a microprocessor read register, which may be implemented as part of microprocessor 106. However, in FIG. 1, it is shown as a separate functional block for clarity of disclosure. Microprocessor 106 may then read the contents of read register 104 at its convenience (i.e., not necessarily synchronously according to the data rate of data bus 101). This reverse data path is used for the AUX DSP 116 to send information to the microprocessor 106 in, for example, either the acoustic echo canceling or voice recognition modes.

The present invention also provides a comprehensive communication protocol that allows full-duplex communications between the communication device 100 and the external accessory 102. Any application running on the communication device 100 or external accessory 102 (e.g., software routines in microprocessor 106 or AUX DSP 116) that requires the use of full duplex messaging over the data bus 101 may use the communication protocol of the present invention. For example, voice recognition applications or acoustic echo canceling applications may use this protocol.

The novel communication protocol of the present invention will now be described with reference to the exemplary embodiment of interfacing a portable wireless telephone to an external car kit adapter having voice recognition (VR), acoustic echo canceling (AEC), volume control and audio control. It is understood that the present invention is equally applicable to other embodiments having other applications. However, for simplicity and clarity of disclosure, the invention will be disclosed with reference to this exemplary embodiment.

The exemplary embodiment of the present invention provides for different classes of commands to be communicated from the microprocessor 106 to the external accessory 102. These classes of commands include:

1. Generic Commands;
2. Commands from the Microprocessor 106 to the Voice Recognition Unit (VRU) in AUX DSP 116;
3. Commands from the Microprocessor 106 to the AEC in AUX DSP 116;
4. Volume Control Commands from the Microprocessor 106 to the AUX DSP 116; and
5. Audio Control Commands from the Microprocessor 106 to the AUX DSP 116.

The generic commands from the microprocessor 106 are accepted and acted upon by the AUX DSP 116 during any operational state of the external accessory 102. These generic commands include:

1. Software Version Number (SVN) Inquiry;
2. Carkit Status Inquiry;
3. Acknowledgment Information;
4. Goto Idle Mode;
5. Goto Alternate Protocol;
6. Power Down Delay Settings; and
7. Extended Software Version Number Inquiry.

The microprocessor 106 uses the Software Version Number Inquiry command to inquire the software version number of the external accessory 102 after power up. The Software Version Number Inquiry command allows the microprocessor 106 to determine whether the software version number of the external accessory 102 is of a correct revision to support certain applications, such as voice recognition.

The Carkit Status Inquiry command allows the microprocessor 106 to poll the current status of the external accessory 102 whenever appropriate. This allows the microprocessor 106 to check the consistency of the operational modes between the microprocessor 106 and the AUX DSP 116. For example, this command allows the microprocessor 106 to refresh its own memory about the privacy handset status, audio path setup, stereo mute/un-mute status, power status and volume status at its convenience. If the actual mode reported by the AUX DSP 116 is different than that expected by the microprocessor 106, then the microprocessor 106 may order the external accessory 102 to change its operational status, or the microprocessor 106 may change its own internal status to regain consistency with the external accessory 102.

After a group of information is received by the microprocessor 106 from the AUX DSP 116, the microprocessor 106 will send an Acknowledgement Information command to the AUX DSP 116. The AUX DSP 116 does not send the next group of information until this Acknowledgement Information command is received from the microprocessor 106. Thus, the Acknowledgement Information command provides for reliable data transmission over the data bus 101.

The Goto Idle mode command instructs the AUX DSP 116 to enter Idle mode (i.e., to leave the active application). This command allows the microprocessor 106 to switch the AUX DSP 116 from any operational mode into the Idle state. There are two conditions that can lead to the AUX DSP 116 entering the Idle state. First, if the microprocessor 106 sends a Goto Idle mode command, and second if the AUX DSP 116 does not receive the clock signal used by the present invention (discussed more fully below) for a predetermined period. In the exemplary embodiment, this predetermined period is 8.75 ms.

The Goto Alternate Protocol mode command instructs the AUX DSP 116 to use an alternate communication protocol, rather than the communication protocol of the present invention as disclosed herein. This alternate communication protocol may be a previous generation protocol, or a protocol that supports additional or separate features and applications.

The Power Down Delay Setting command is used by the phone to delay the power down action of the external accessory 102 when it is connected to an external power source (such as a car ignition) and the external power source is turned off.

The Extended Software Version Number Inquiry is used by the microprocessor 106 to inquire the extended version stamp from the AUX DSP 116. In this exemplary embodiment, the extended version stamp consists of eight ASCII characters. For example, these eight ASCII characters may be used to refer to the filename utilized by the AUX DSP 116 software build.

In the exemplary embodiment having voice recognition (VR) capability in the AUX DSP 116, the microprocessor 106 also sends commands to the voice recognition unit (VRU) in AUX DSP 116. A more detailed discussion of the VRU is given in U.S. patent application Ser. No. xx/xxx,xxx, entitled "VOICE RECOGNITION USER INTERFACE FOR TELEPHONE HANDSET", filed xxx xx, xxxx, Attorney Docket Number 990049, assigned to the assignee of the present invention and incorporated herein by reference. In this just-mentioned co-pending application, the VR templates and corresponding phone numbers are saved in the AUX DSP 116. Thus, an exemplary set of commands that the microprocessor 106 would send to the AUX DSP 116 includes the following:

1. VR Initialization
2. VR Recognition
3. YES (Yes Key)
4. NO (NO Key)
5. CANCEL/CLEAR (CANCEL or CLEAR Key)
6. NEXT/MORE (NEXT or MORE Key)
7. PREVIOUS (PREVIOUS Key)
8. Train Basic Set
9. Train Digit Set
10. Force Program (PROGRAM Key)
11. Force Retrain (RETRAIN Key)
12. Force Train (TRAIN Key)
13. VR Memory Reset
14. Clear Phonebook
15. VR Status Inquiry 16. Incoming Call 17. Incoming Roam Call 18. Digits, 0–9, # (Pound Key), * (Star Key), Pause 19. End of Digit String Any input from the user interface (not shown), such as a keypad, is translated by the microprocessor 106 and transmitted to the VRU in AUX DSP 116 to maintain synchronization between the communication device 100 and the external accessory 102. This ensures that the VRU will act appropriately, such as playing the correct voice prompts to solicit audio input from the user.

The VR Initialization command is used to drive the AUX DSP 116 from Idle mode (where no VR tasks are being performed) to VR Standby Mode. The VR Recognition command will normally follow the VR Initialization command and is used to drive the AUX DSP 116 from VR Standby mode to VR Recognition mode where it actively performs voice recognition tasks. In the preferred embodiment, the YES, NO, CANCEL/CLEAR, NEXT/MORE, PREVIOUS, Digits 0–9, pound, star, and pause commands are sent in response to the user pressing the associated keys on the keypad (not shown). This provides a means for the user to respond to prompts and menu selections from the VRU.

The Train Basic Set, Train Digit Set, Force Program, Force Retrain, and Force Train commands are used in "training" the VRU to recognize the individual speaker's voice, including recognizing commands, digits and nametags. The VR Memory Reset command is used to reset the nametags, the associated phone numbers, and the VR templates. In other words, this command would cause AUX DSP 116 to erase all the memories programmed. The Clear Phonebook command is used to reset all the entries of the user's own personal phonebook directory, including both nametags and the associated phone numbers. The Clear Phonebook command, unlike the VR Memory Reset command, does not erase the VR templates associated with control words.

The VR Status Inquiry command is used by microprocessor 106 to determine the present status of the VRU (e.g., Idle, Standby, or Voice Recognition modes). The Incoming Call and Incoming Roam Call commands are used by microprocessor 106 to inform AUX DSP 116 that there is an incoming call while in the VR mode. In response, the VRU will play an appropriate voice prompt to solicit input from the user. The End of Digit String command is used by the microprocessor 106 to convey the end of a string of digits (such as a phone number) to the AUX DSP 116.

In the exemplary embodiment, the microprocessor 106 also sends commands to the acoustic echo canceller (AEC) in AUX DSP 116. If the communication device 100 is a dual-mode analog/CDMA wireless telephone, these AEC control commands include:

1. FM AEC On;

2. CDMA AEC On (Noise Suppressor On); and

3. CDMA AEC On (Noise Suppressor Off).

The microprocessor 106 may order the AUX DSP 116 to switch to VR mode from AEC mode by using the VR Initialization command explained above.

In the exemplary embodiment, the microprocessor 106 also sends commands for PCM volume control to AUX DSP 116. These commands are used to adjust the output speech volume digitally within AUX DSP 116. The microprocessor 106 sends a PCM Volume Level Index to the AUX DSP 116.

In the exemplary embodiment, the microprocessor 106 also sends Audio Control commands to the AUX DSP 116. These commands are used, for example, to mute and un-mute a car stereo that is located in the same vehicle so that the user's voice may be heard by the VRU. Another example is a Privacy Handset Operation command that will mute the microphone 122 so that the user may speak without the called party hearing the user's voice.

The exemplary embodiment of the present invention also provides for different classes of information to be communicated from the AUX DSP 116 to the microprocessor 106. These classes of information include:

1. Software Version Number (SVN);

2. VR Mode;

3. Generic Mode; and

4. Extended Software Version Number.

The SVN is used as a response to the Software Version Inquiry command from microprocessor 106 described above. In the exemplary embodiment, the range of the SVN is from 0 to 1023 in decimal. The AUX DSP 116 may report the SVN, together with other information such as Privacy Handset Status and VR Status, to the microprocessor 106 spontaneously after the PCM clock signal (described more fully below) is first detected by AUX DSP 116.

Based on the VR mode commands outlined above from the microprocessor 106 to the AUX DSP 116, it can be readily seen that the VRU in AUX DSP 116 must provide certain information back to microprocessor 106. For example, the AUX DSP 116 may transmit the VSN and VWN (Vocabulary Word Number) to send a sequence of digits ended with the End of Digit String command to deliver digits for voice dialing. It may also report the VR status and solicit a display (not shown) in communication device 100 to provide appropriate visual user feedback (e.g., menus and messages) to guide the user while operating in VR mode. Alternately, the AUX DSP 116 may use the VR Digits and End of Digit String commands to reduce the traffic and accelerate the voice dialing process as compared to the VSN and VWN messages. However, this is limited to digits only, not control bytes.

Generic Mode information includes the following:

1. Privacy Handset Offhook/Onhook;

2. Current Audio Path;

3. PCM Volume Control;

4. Power Status;

5. Stereo Mute/Un-mute; and

6. Carkit Modes.

Each of these groups of information relays information about the various operational parameters and states of the external accessory 102. This information may be provided from AUX DSP 116 to microprocessor 106 upon specific inquiry by microprocessor 106. Additionally, the AUX DSP 116 may spontaneously report some or all of the above information upon a change in status. For example, when the privacy handset position changes, when the power status changes, when the data detection status changes, or when the VRU changes its operational state.

As mentioned previously, the Extended SVN information is stored in AUX DSP 116 as a version stamp, which consists of eight ASCII characters. For example, the version stamp may be used to encode the filename of the DSP software source file. The Extended SVN information is reported only when the microprocessor 106 transmits the Extended SVN Inquiry command described above.

Figure 2A:
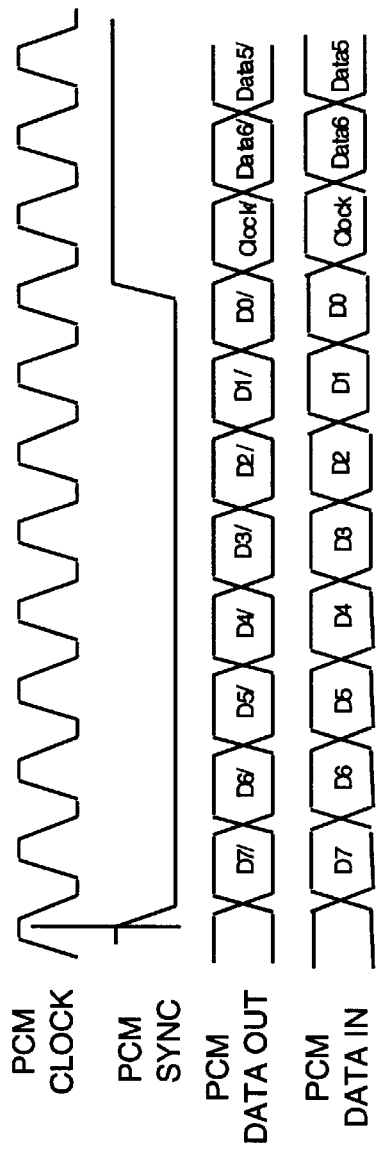
FIG. 2 is a timing diagram of the exemplary embodiment of the present invention.
Figure 2B:
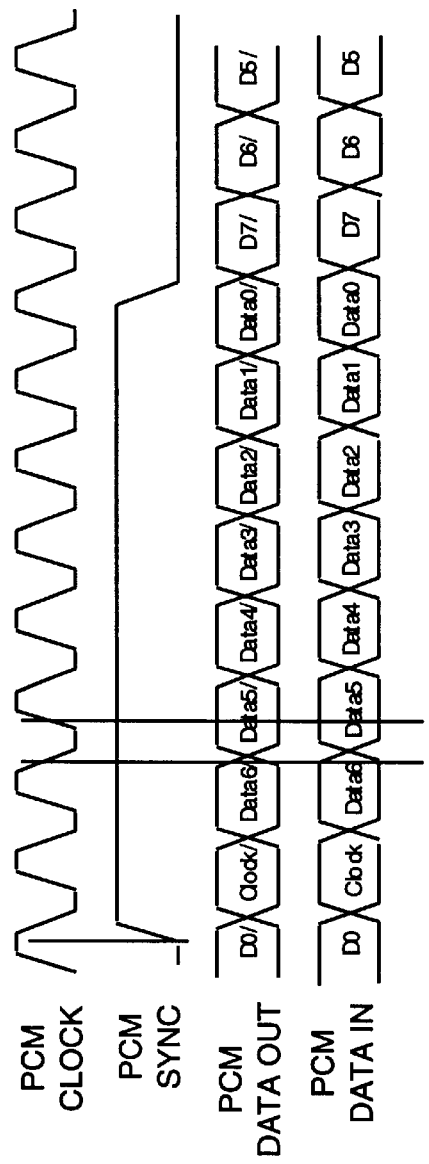

Turning now to FIGS. 2A and 2B, a timing diagram of the signaling format used on data bus 101 is illustrated. FIG. 2A illustrates a timing diagram for the first time slot of the two 8-bit time slots, and FIG. 2B illustrates a timing diagram for the second time slot of the two 8-bit time slots. Note that for clarity and continuity of explanation, there is some overlap between FIG. 2A and FIG. 2B. As previously stated, the first time slot shown in FIG. 2A is used for carrying μ-law encoded data such as voice data. The second time slot shown in FIG. 2B is used for carrying control data and information data, such as the control commands and information groups described above.

As can be seen in both FIGS. 2A and 2B, the PCM dock is preferably a 128 KHz clock signal. A separate signal, PCM SYNC, is preferably an 8 KHz synchronization signal. In FIG. 2A, the PCM SYNC signal is low for the first time slot. In FIG. 2B, the PCM SYNC signal is high for the second time slot. The signals PCM DATA OUT and PCM DATA IN of FIGS. 2A and 2B are used to carry the actual information data across the data bus 101. In both FIGS. 2A and 2B, the PCM DATA OUT and PCM DATA IN signals are illustrated as being in either the high or low state for each data bit, according to the value of the data bits they are carrying.

In FIG. 2A, PCM DATA OUT is illustrated as being comprised of the data bits D7/, D6/, D5/, D4/, D3/, D2/, D1/, and D0/. Similarly, in FIG. 2A, PCM DATA IN is illustrated as being comprised of the data bits D7, D6, D5, D4, D3, D2, D1, and D0. These data bits represent an eight-bit first time slot which carries μ-law encoded voice data between the communication device 100 and the external accessory 102. These bits are clocked serially across the data bus 101 by the PCM CLOCK signal. The signal PCM DATA OUT flows in the direction from the communication device 100 to the external accessory 102. The signal PCM DATA IN flows in the reverse direction from the external accessory 102 to the communication device 100. Both the PCM CLOCK signal and the PCM SYNC signal flow in the direction from the communication device 100 to the external accessory 102.

At the end of the first 8-bit time slot, the second 8-bit time slot begins. The second 8-bit time slot is shown in FIG. 2B. In FIG. 2B, PCM DATA OUT is illustrated as being comprised of a single clock bit, Clock/, and seven data bits, Data6/, Data5/, Data4/, Data3/, Data2/, Data1/, and Data0/. These clock and data bits represent the second eight-bit time slot that carries command and control data, such as that described above, from microprocessor 106 to AUX DSP 116. The Clock/bit is used to latch and combine data across time slots. The Data6/–Data0/bits are 7 bits per sample at each time slot used to accumulate the control information from the microprocessor 106. Similarly, the signal PCM DATA IN is shown as being comprised of a single clock bit, Clock, and seven data bits, Data6, Data5, Data4, Data3, Data2, Data1, and Data0. These clock and data bits represent the second eight-bit time slot that carries information and inquiry response data, such as that described above, from AUX DSP 116 to microprocessor 106.

In the direction of the microprocessor 106 to the AUX DSP 116, the format of the information carried by the second eight-bit time slot is given below in TABLE I for an N+1 byte command.

TABLE I

Bit Configuration for N + 1 Byte Command

| | 8 Bits of Second Time Slot | | | | | | | Configuration |
|---|---|---|---|---|---|---|---|---|
| Byte # | Clock | Data 6 | Data 5 | Data 4 | Data 3 | Data 2 | Data 1 | Data 0 | Description |
| 0 | 0 | S6 | S5 | S4 | S3 | S2 | S1 | S0 | Synchronization Bits |
| 1 | 1 | M2 | M1 | M0 | D3 | D2 | D1 | D0 | Mode Bits and |
| 2 | 0 | 0 | D9 | D8 | D7 | D6 | D5 | D4 | Data Bits. |
| ... | ... | ... | ... | ... | ... | ... | ... | ... | |
| N | 1 | 0 | $D_{6N-3}$ | $D_{6N-4}$ | $D_{6N-5}$ | $D_{6N-6}$ | $D_{6N-7}$ | $D_{6N-8}$ | Terminate with a data byte with Clock = 1 |

As can be seen from TABLE I, the initial byte (Byte 0) of any command from the microprocessor 106 begins with the Clock bit being set to 0 (low). Alternately, it could be set to high in a different embodiment. However, as can be seen from TABLE I, the Clock bit of each byte alternates to allow the AUX DSP 116 to keep track of commands across the time slots. The next seven bits of the initial byte of any command are synchronization bits: S6, S5, S4, S3, S2, S1, and S0. Together, these synchronization bits form a synchronization header. In the exemplary embodiment, the synchronization header for a command packet is the bit pattern '1111110' (0x7e hexadecimal). Note that the synchronization bits of TABLE I are to be distinguished from the PCM SYNC signal of FIGS. 2A and 2B, which is a separate signal.

The next byte of any command (Byte 1) begins with the opposite Clock bit as was used to start the previous byte. Here, because the previous byte began with the Clock bit '0', Byte 1 begins with Clock bit '1'. The next three bits of the byte are mode bits M2, M1, and M0. These mode bits are used to identify the class or type of command being transmitted by microprocessor 106. In the exemplary embodiment, the mode bits configuration is given in TABLE II below.

TABLE II

| Mode Bits Configuration | | | |
|---|---|---|---|
| M2 | M1 | M0 | Description |
| 0 | 0 | 0 | Generic and AEC Commands |
| 0 | 0 | 1 | Audio Control |
| 0 | 1 | 0 | PCM Volume Control |
| 0 | 1 | 1 | VR Digit Keys |
| 1 | 0 | 0 | VR Commands |
| x | x | x | [M2–M0]=0x5–0x7, Reserved. |

Referring again to TABLE I, the remaining bits of Byte 1, D3, D2, D1, and D0 are data bits used to convey the actual command, whose definition is dependent upon the value of the previous mode bits. In other words, for each combination of mode bits [M2–M0], the data bits [D3–D0] represent a different command. Each of the commands described above are represented by a different combination of mode bits and data bits. Commands that are more than two-bytes in length are also provided by the format outlined in TABLE I, by adding on an additional number of data bytes. For each of these additional data bytes, it should be noted that the value of the Data6 bit is set to '0' to prevent the combination of mode bits and data bits from replicating the reserved sync bit pattern '1111110' (0x7e hex).

It also should be noted that a microprocessor 106 command always consists of an even number of bytes (i.e., N+1 is an even number in TABLE I), and always starts with the sync byte 0x7e (hex). The even total number of bytes per command ensures that any command would end with a Clock bit set to '1'. This prevents confusion as to whether the last byte of any command was the start of a new block of command bytes (which would begin with Clock bit '0').

An exemplary configuration of data bits for the various exemplary modes are shown in the TABLES III–VIII below.

TABLE III

Data Bits Definition of Mode 0 Commands

| D3 | D2 | D1 | D0 | Description |
|----|----|----|----|-------------|
| 0 | 0 | 0 | 0 | SVN Inquiry |
| 0 | 0 | 0 | 1 | ACK_0 |
| 0 | 0 | 1 | 0 | ACK_1 |
| 0 | 0 | 1 | 1 | Carkit Status Inquiry |
| 0 | 1 | 0 | 0 | FM AEC On |
| 0 | 1 | 0 | 1 | CDMA AEC On (Noise Suppressor On) |
| 0 | 1 | 1 | 0 | CDMA AEC On (Noise Suppressor Off) |
| 0 | 1 | 1 | 1 | Goto Idle |
| 1 | 0 | 0 | 0 | Goto Alternate Protocol |
| 1 | 0 | 0 | 1 | Power Down Delay 0 |
| 1 | 0 | 1 | 0 | Power Down Delay 1 |
| 1 | 1 | 0 | 0 | Extended SVN Inquiry |
| 1 | x | x | x | [D3–D0]=0xD–0xF, Reserved |

TABLE IV

Data Bits Definition of Mode 1 Commands

| Bit | Description |
|-----|-------------|
| D0 | Stereo Un-mute(0)/Mute(1), |
| D1 | Privacy Handset(0)/Handsfree(1) |
| D2, D3 | Reserved (Default 0) |

TABLE V

Data Bits Definition of Mode 2 Commands

| D3 | D2 | D1 | D0 | Description |
|----|----|----|----|-------------|
| 0 | x | x | x | [D2–D0]=PCM Volume Level Index(0x0–0x7) 0x7:Audio mute 0x0–0x6: indices used by the AUX DSP for appropriate amplification of PCM volume. |
| 1 | x | x | x | Reserved |

TABLE VI

Data Bits Definition of Mode 3 Commands

| D3 | D2 | D1 | D0 | Description |
|----|----|----|----|-------------|
| 0 | 0 | 0 | 0 | '0' |
| 0 | 0 | 0 | 1 | '1' |
| 0 | 0 | 1 | 0 | '2' |
| 0 | 0 | 1 | 1 | '3' |
| 0 | 1 | 0 | 0 | '4' |
| 0 | 1 | 0 | 1 | '5' |
| 0 | 1 | 1 | 0 | '6' |

TABLE VI-continued

Data Bits Definition of Mode 3 Commands

| D3 | D2 | D1 | D0 | Description |
|----|----|----|----|-------------|
| 0 | 1 | 1 | 1 | '7' |
| 1 | 0 | 0 | 0 | '8' |
| 1 | 0 | 0 | 1 | '9' |
| 1 | 0 | 1 | 0 | '#' (Pound) |
| 1 | 0 | 1 | 1 | '*' (Star) |
| 1 | 1 | 0 | 0 | 'Pause' |
| 1 | 1 | 0 | 1 | End of Digit String |
| x | x | x | x | [D3–D0]=0xE–0xF, Reserved |

TABLE VII

Data Bits Definition of Mode 4 Commands

| D3 | D2 | D1 | D0 | Description |
|----|----|----|----|-------------|
| 0 | 0 | 0 | 0 | VR Initialization |
| 0 | 0 | 0 | 1 | VR Recognition |
| 0 | 0 | 1 | 0 | YES |
| 0 | 0 | 1 | 1 | NO |
| 0 | 1 | 0 | 0 | CANCEL/CLEAR |
| 0 | 1 | 0 | 1 | NEXT/MORE |
| 0 | 1 | 1 | 0 | PREVIOUS |
| 0 | 1 | 1 | 1 | Train Basic Set |
| 1 | 0 | 0 | 0 | Train Digit Set |
| 1 | 0 | 0 | 1 | Force Program |
| 1 | 0 | 1 | 0 | Force Retrain |
| 1 | 0 | 1 | 1 | Force Train |
| 1 | 1 | 0 | 0 | VR Memory Reset |
| 1 | 1 | 0 | 1 | Clear Phonebook |
| 1 | 1 | 1 | 0 | VR Status Inquiry |
| x | x | x | x | [D3–D0]=0xF, Reserved |

TABLE VIII

Data Bits Definition of Mode 5 Commands

| D3 | D2 | D1 | D0 | Description |
|----|----|----|----|-------------|
| 0 | 0 | 0 | 0 | Incoming Call |
| 0 | 0 | 0 | 1 | Incoming Roam Call |
| x | x | x | x | [D3–D0]=0x2–0xF, Reserved |

It should be again noted that the total number of command bytes for each microprocessor 106 command, including one sync byte, is an even number. This ensures that the Clock bit of the Sync byte is always '0'. It thereby facilitates the integration of command bytes in the AUX DSP 116. Additionally, there are two types of Acknowledgement commands from the microprocessorr 106 to the AUX DSP 116. They are listed in TABLE III above as ACK_0 and ACK_1. ACK_0 is used by the microprocessor 106 to acknowledge the bytes from the AUX DSP 116 that have the Clock bit '0', while ACK_1 is used by the microprocessor 106 to acknowledge the bytes from the AUX DSP 116 that have the Clock bit '1'. The microprocessor 106 repeats the ACK command periodically. This prevents potential deadlocks of the communication between the microprocessor 106 and the AUX DSP 116 over the data bus 101.

AUX DSP 116 decodes the above commands and information data from microprocessor 106, and acts on them appropriately. In order for AUX DSP 116 to properly decode these commands and information, it must determine when their format is valid by counting the number of bytes received. According to the above-described protocol, it is clear that an incoming group of information (e.g., a command) is only valid when 8 consecutive bits are received. If less than 8 consecutive bits are received, they will be discarded and the AUX DSP 116 will begin counting again. Additionally, if a valid information group (i.e., all 8 consecutive bits) is received, but the command is not within the above-protocol, it will be discarded.

The present invention also provides a protocol for transmission of information from AUX DSP 116 to microprocessor 106. It is very similar to the protocol for transmissions from microprocessor 106 to AUX DSP 116 as described above. However, there are certain differences that will be noted.

TABLE IX below shows the bit configuration for a message of N+1 bytes from AUX DSP 116 to microprocessor 106. Any of the messages outlined above from AUX DSP 116 to microprocessor 106 may be transmitted using the bit configuration of TABLE IX.

TABLE X

Mode Bits Configuration

| M2 | M1 | M0 | Description |
|----|----|----|-------------|
| 0 | 0 | 0 | Illegal |
| 0 | 0 | 1 | Generic (HFK Status) |
| 0 | 1 | 0 | VR Mode, VSN+VWN |
| 0 | 1 | 1 | SVN |
| 1 | 0 | 0 | VR Mode, Digits |
| 1 | 0 | 1 | VR Mode, State |
| 1 | 1 | 0 | Extended SVN |
| x | x | x | [M2–M0]=0x7, Reserved. |

For each of the different modes, the data bits have different meanings, as outlined in the following tables. For

TABLE IX

Bit Configuration for (N + 1) Bytes Message

| | | 8 Bits of Second Time Slot | | | | | | Configuration |
|---|---|---|---|---|---|---|---|---|
| Byte # | Clock | Data 6 | Data 5 | Data 4 | Data 3 | Data 2 | Data 1 | Data 0 | Description |
| 0 | 1 | S6 | S5 | S4 | S3 | S2 | S1 | S0 | Synchronization Bits |
| 1 | 0 | M2 | M1 | M0 | D3 | D2 | D1 | D0 | Mode Bits and |
| 2 | 1 | 0 | D9 | D8 | D7 | D6 | D5 | D4 | Data Bits. |
| ... | ... | ... | ... | ... | ... | ... | ... | ... | |
| N | 0 | 1 | $D_{6N-3}$ | $D_{6N-4}$ | $D_{6N-5}$ | $D_{6N-6}$ | $D_{6N-7}$ | $D_{6N-8}$ | Terminate with a data byte with Clock = 0 |

As can be seen from a comparison of TABLE IX to TABLE I above, one difference is that the first byte (Byte 0) of any message from the AUX DSP 116 to the microprocessor 106 begins with the Clock bit '1', rather than the Clock bit '0'. Additionally, the last byte (Byte N, where N is odd) of any message from the AUX DSP 116 to the microprocessor 106 will begin with a Clock bit '0', rather than the Clock bit '1'. As noted above, it is this alternating of Clock bits, and the last byte of the message using the opposite clock bit as used in the first byte of the message that allows microprocessor 106 to track received messages accurately and accumulate multi-byte messages over several bytes.

In the exemplary embodiment, the synchronization bits [S6–S1] from AUX DSP 116 to microprocessor 106 are different than those shown above for the direction from the microprocessor 106 to the AUX DSP 116. In the exemplary embodiment, the sync bits [S6–S1] from AUX DSP 116 are '1001100'. As previously noted, these sync bits [S6–S1] serve to separate two separate multi-byte messages from AUX DSP 116 to microprocessor 106.

The mode bits [M2–M0] of TABLE IX serve the same purpose as those of TABLE I above. TABLE X below shows the mode bits configuration for messages from the AUX DSP 116 to the microprocessor 106. It should be noted that the data bits after the first information group are set so that Data6 is equal to Clock/. This prevents the sequence of Mode Bits plus Data Bits from mimicking the reserved sync bit pattern, 0xCC (hex). It should also be noted that Mode 0 (e.g., M2, M1, M0 all set to zero) is disallowed so that information group 1 can not be the 0x00 pattern. It is undesirable to have a 16 bit frame where the μ-law data is 0x00 in the first 8-bit time slot, and the message data is also 0x00 in the second 8-bit time slot This all-zero sequence may be misinterpreted as the external accessory 102 being disconnected from the data bus 101.

Mode 1, [M2–M0]=0x1, the data bits are used to convey Generic Mode and status information. The data format of the message in Generic Mode is a 4-byte message as shown below in TABLE XI. The Mode 1 command for status may be sent spontaneously by AUX_DSP 116 upon a change of status that should be displayed to the user on a display (not shown). For example, an ignition status change, a privacy handset status change, or a VRU status change.

TABLE XI

Data Bits Definition at Mode 1 Messages

| Bits | Description |
|------|-------------|
| D0 | IGN_5V_OFF(0)/IGN_5V_ON(1) |
| D1 | Privacy Offhook(0)/Onhook(1) |
| D2 | Handset(0)/Handsfree(1) |
| D3 | Stereo_Unmute(0)/Stereo_Mute(1) |
| D6–D4 | PCM Volume Index |
| [D10–D7] | 0x0: IDLE |
| | 0x1: AEC_FM |
| | 0x2: AEC_CDMA_NS_ON |
| | 0x3: AEC_CMDA_NS_OFF |
| | 0x4 VR_RECOG |
| | 0x5 VR_PROGRAM |
| | 0x6–0xF: Reserved |
| D14–D11 | Reserved (Default 0x0) |
| D15 | Data Detection Off(0)/On(1) |

For Mode 2, the messages are VR Mode messages using vocabulary set number (VSN) and vocabulary word number (VWN). The vocabulary words are partitioned into vocabulary sets. Each vocabulary word is denoted with a VSN and a VWN. The mapping of vocabulary words to VSN and VWN is shown in TABLE XII. It requires four information groups (bytes) to complete the data packets for each VSN and VWN combination. The format of data bits for this four byte message is given in TABLE XII below where [D4–D0] is the VSN (0x0–0x1F), and [D15–D5] is the VWN (0x0–0x7FF).

TABLE XII

Mapping of Vocabulary Words to VSN+VWN

| VSN | Vocabulary Word |
|---|---|
| 0 (Control Word) | VWN:<br>0x0 Call<br>0x1 Redial<br>0x2 Program<br>0x3 Book<br>0x4 Add<br>0x5 Delete<br>0x6 Yes<br>0x7 No<br>0x8 Exit<br>0x9 Number<br>0xA Clear<br>0xB End<br>0xC Verify<br>0xD Cancel<br>0xE Directory<br>0xF Dial<br>0x10 Talk<br>0x11–0x7FF, Reserved |
| 1 (Digit) | VWN:<br>0x0 One<br>0x1 Two<br>0x2 Three<br>0x3 Four<br>0x4 Five<br>0x5 Six<br>0x6 Seven<br>0x7 Eight<br>0x8 Nine<br>0x9 Zero<br>0xA Oh<br>0xB Star<br>0xC Pound<br>0xD–0x7FF, Reserved |
| 2 (Nametag) | Nametag Set (up to 40) |
| 3–15 | Reserved |

Mode 3 messages are SVN messages. The data format for Mode 3 messages is shown below in TABLE XIII. Mode 3 messages are 4-byte messages. The Mode 3 message may be sent spontaneously by AUX DSP 116 when the PCM CLOCK signal (FIG. 2) is first detected by AUX DSP 116, indicating that external accessory 102 has just been connected to the communication device 100.

TABLE XIII

Data Bits Definiton for Mode 3 Messages

| Bits | Description |
|---|---|
| D0 | Without VR(0)/With VR(1) |
| D1 | Privacy Handset Offhook(0)/Onhook(1) |
| D5–D2 | Reserved (Default 0x0) |
| D15–D6 | SVN (0x0–0x3FF) |

Mode 4 messages are VR Digits messages. The data format for Mode 4 messages is shown in TABLE XIV. Mode 4 messages are 2-byte messages.

TABLE XIV

Data Bits Definition for Mode 4 Messages

| D3 | D2 | D1 | D0 | Description |
|---|---|---|---|---|
| 0 | 0 | 0 | 0 | '0' |
| 0 | 0 | 0 | 1 | '1' |
| 0 | 0 | 1 | 0 | '2' |
| 0 | 0 | 1 | 1 | '3' |
| 0 | 1 | 0 | 0 | '4' |
| 0 | 1 | 0 | 1 | '5' |
| 0 | 1 | 1 | 0 | '6' |
| 0 | 1 | 1 | 1 | '7' |
| 1 | 0 | 0 | 0 | '8' |
| 1 | 0 | 0 | 1 | '9' |
| 1 | 0 | 1 | 0 | '#' (Pound) |
| 1 | 0 | 1 | 1 | '*' (Star) |
| 1 | 1 | 0 | 0 | 'Pause' |
| 1 | 1 | 0 | 1 | End of Digit String |
| x | x | x | x | [D3–D0]=0xE–0xF, Reserved |

Mode 5 messages are VR Status messages. The data format of the Mode 5 messages is shown below in TABLE XV. Mode 5 messages are 4-byte messages. It should be noted that in TABLE XV below, there are two Groups: Group 0 and Group 1. When a VR Status Inquiry is received by AUX DSP 116, the Group 0 message will be reported to reflect the current VR state. Group 1 messages are reported spontaneously by AUX DSP 116 whenever appropriate.

TABLE XV

Data Bits Definition for Mode 5 Messages

| Bits | Description |
|---|---|
| [D3–D0]=0x0<br>(Group 0) | [D15–D4]:<br>0x0: VR_RECOG_MODE<br>0x1: VR_PROG_MODE<br>0x2: VR_INIT_TRAIN_MODE<br>0x3 VR_CALL_MODE<br>0x4 VR_NUMBER_MODE<br>0x5 VR_REDIAL_MODE<br>0x6 VR_BOOK_MODE<br>0x7 VR_ADD_MODE<br>0x8: VR_DELETE_MODE<br>0x9 VR_TRAIN_MODE<br>0xA VR_RETRAIN MODE<br>0xB VR_STANDBY_MODE<br>0xC–0xFFF: Reserved |
| [D3–D0]=0x1<br>(Group 1) | 0x0: VR_NOT_RECOGNIZED<br>0x1: VR_RECOGNIZED<br>0x2: VR_PHONEBOOK_FULL<br>0x3: VR_PHONEBOOK_EMPTY<br>0x4: VR_N_BEST<br>0x5: VR_DIGIT_NOT_TRAINED<br>0x6–0xFFF: Reserved |

Mode 6 messages are Extended SVN messages. The data format of Mode 6 messages is given below in TABLE XVI. The Extended SVN message is a 10-byte message. 52 data bits are used to represent the Extended SVN data, which, as previously noted, consists of 8 ASCII characters. The offset of each character's ASCII code from the '0' character (0x30 hex) is encoded in the last 8 bytes of the message.

TABLE XVI

Data Bits Definiton for Mode 6 Messages

| Bits | Description |
|---|---|
| [D3–D0]=0x0<br>(Group 0) | [D9–D4]: ASCII_CODE_0–0x30<br>[D15–D10]: ASCII_CODE_1–0x30<br>[D21–D16]: ASCII_CODE_2–0x30<br>[D27–D22]: ASCII_CODE_3–0x30 |

TABLE XVI-continued

Data Bits Definition for Mode 6 Messages

| Bits | Description |
|---|---|
| | [D33–D28]: ASCII_CODE_4–0x30 |
| | [D39–D34]: ASCII_CODE_5–0x30 |
| | [D45–D40]: ASCII_CODE_6–0x30 |
| | [D51–D46]: ASCII_CODE_7–0x30 |
| [D3–D0]=0x1–0x7 | Reserved |

As with the commands from microprocessor 106 to AUX DSP 116, all messages from the AUX DSP 116 to the microprocessor 106 consist of an even number of bytes. However, the messages from the AUX DSP 116 to the microprocessor 106 start with the byte 0xCC with Clock bit set to '1', and end with the last byte having a Clock bit set to '0'. Thus, each of the messages is at least a 2-byte message.

A message byte sent from the AUX DSP 116 to the microprocessor 106 is acknowledged by the microprocessor 106. The AUX DSP 116 does not send the next message byte unless a corresponding Acknowledge command is received. As a result, the contents of read register 104 (FIG. 1) stay unchanged until microprocessor 106 reads the contents, and sends out the Acknowledge command. This ensures that the microprocessor 106 will not miss the contents of the read register 104.

Any message byte from the AUX DSP 116 to the microprocessor 116 will be not all zeros (0x00). The reason is that this byte, if combined with a 0x00 μ-law data byte could lead to a false indication that the external accessory 102 is not connected to data bus 101.

Thus, the present invention provides a communication protocol between a communication device and an external accessory that operates reliably in full-duplex. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of communicating both voice and control data between a communication device and an external accessory over a data bus, the method comprising the steps of:
   formatting a sequence of bits into a repeating sequence of first time slots and second time slots;
   transmitting said voice data in said first time slots; transmitting redundant control data in said second time slots;
   wherein a first bit of each of said second time slots comprises a clock bit that alternates between a high value and a low value as between consecutive second time slots.

2. The method of claim 1 wherein said sequence of second time slots comprises N+1 bytes, an initial byte of said N+1 bytes further comprising a synchronization bit sequence.

3. The method of claim 2 wherein a second of said N+1 bytes comprises mode bits for defining a meaning of the remainder of said N+1 bytes.

4. The method of claim 3 wherein N is an odd integer.

5. The method of claim 4 wherein said clock bit of a last byte of said N+1 bytes is of an opposite polarity than said clock bit of said initial byte of said N+1 bytes.

6. The method of claim 5 further comprising the step of setting a second bit of each of a respective third and higher-order of said N+1 bytes to an opposite polarity as said clock bit of each of said respective third and higher-order of said N+1 bytes.

7. An apparatus for communicating both voice and control data, the apparatus comprising:
   a communication device having a microprocessor; and
   a data bus coupled to said communication device for providing said voice and control data to an external accessory;
   wherein said microprocessor formats a sequence of bits into a repeating sequence of first time slots and second time slots, and transmits said voice data in said first time slots and said control data redundantly in said second time slots, and wherein a first bit of each of said second time slots comprises a clock bit that alternates between a high value and a low value as between consecutive second time slots.

8. The apparatus of claim 7 wherein said sequence of second time slots comprises N+1 bytes, an initial byte of said N+1 bytes further comprising a synchronization bit sequence.

9. The apparatus of claim 8 wherein a second of said N+1 bytes comprises mode bits for defining a meaning of the remainder of said N+1 bytes.

10. The apparatus of claim 9 wherein N is an odd integer.

11. The apparatus of claim 10 wherein said dock bit of a last byte of said N+1 bytes is of an opposite polarity than said clock bit of said initial byte of said N+1 bytes.

12. The apparatus of claim 11 further comprising the step of setting a second bit of each of a respective third and higher-order of said N+1 bytes to an opposite polarity as said clock bit of each of said respective third and higher-order of said N+1 bytes.

13. An apparatus for communicating both voice and control data, the apparatus comprising:
   an external accessory having a digital signal processor; and
   a data bus for providing said voice and control data to a communication device;
   wherein said digital signal processor formats a sequence of bits into a repeating sequence of first time slots and second time slots, and transmits said voice data in said first time slots and said control data redundantly in said second time slots, and wherein a first bit of each of said second time slots comprises a clock bit that alternates between a high value and a low value as between consecutive second time slots.

14. The apparatus of claim 13 wherein said sequence of second time slots comprises N+1 bytes, an initial byte of said N+1 bytes further comprising a synchronization bit sequence.

15. The apparatus of claim 14 wherein a second of said N+1 bytes comprises mode bits for defining a meaning of the remainder of said N+1 bytes.

16. The apparatus of claim 15 wherein N is an odd integer.

17. The apparatus of claim 16 wherein said clock bit of a last byte of said N+1 bytes is of an opposite polarity than said clock bit of said initial byte of said N+1 bytes.

18. The apparatus of claim 17 further comprising the step of setting a second bit of each of a respective third and higher-order of said N+1 bytes to an opposite polarity as said clock bit of each of said respective third and higher-order of said N+1 bytes.

19. The method of claim 1 further comprising the step of repeatedly transmitting a same control data byte for a predetermined number of occurrences of said second time slots.

20. The apparatus of claim 13 wherein said digital signal processor repeatedly transmits a same control data byte for a predetermined number of occurrences of said second time slots.

* * * * *